United States Patent
Gaggar et al.

(10) Patent No.: US 6,740,696 B1
(45) Date of Patent: May 25, 2004

(54) FLAME RETARDANT POLYCARBONATE/ GRAFT COPOLYMER BLENDS EXHIBITING HEAT AGING STABILITY

(75) Inventors: Satish Kumar Gaggar, Parkersburg, WV (US); Fuh-Sheng Chen, Parkersburg, WV (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 08/841,027

(22) Filed: Apr. 29, 1997

Related U.S. Application Data

(63) Continuation of application No. 08/551,595, filed on Nov. 1, 1995, now abandoned.

(51) Int. Cl.[7] .............................................. C08K 5/521
(52) U.S. Cl. ...................................... 524/127; 524/141
(58) Field of Search ................................. 524/127, 141

(56) References Cited

U.S. PATENT DOCUMENTS

| | | | |
|---|---|---|---|
| 4,016,139 A | | 4/1977 | Anderson et al. |
| 4,107,232 A | | 8/1978 | Haaf et al. |
| 4,463,130 A | | 7/1984 | Serini et al. |
| 4,579,906 A | | 4/1986 | Zabrocki et al. |
| 4,751,260 A | * | 6/1988 | Kress et al. ............... 524/141 |
| 4,786,671 A | | 11/1988 | Kress et al. |
| 4,810,739 A | | 3/1989 | Lindner et al. |
| 4,880,862 A | | 11/1989 | Termine et al. |
| 4,883,835 A | | 11/1989 | Buysch et al. |
| 4,927,870 A | | 5/1990 | Ogoe et al. |
| 5,061,745 A | * | 10/1991 | Wittmann et al. ........... 524/141 |
| 5,122,556 A | * | 6/1992 | Kambour .................... 524/141 |
| 5,135,973 A | | 8/1992 | Fukasawa et al. |
| 5,204,394 A | * | 4/1993 | Gosens et al. .............. 524/127 |
| 5,643,981 A | * | 7/1997 | Yang et al. ................. 524/127 |
| 5,672,645 A | * | 9/1997 | Eckel et al. ................ 524/127 |

FOREIGN PATENT DOCUMENTS

| | | |
|---|---|---|
| DE | 4309142 A | 9/1994 |
| EP | 0174493 A | 3/1986 |
| EP | 0363608 A | 4/1990 |
| EP | 0558266 A | 9/1993 |
| EP | 0640655 A | 3/1995 |

OTHER PUBLICATIONS

Lombardo B.S. et al: "Influence of ABS Type on Morphology and Mechanical Properties of PC/ABS Blends" Journal of Applied Polymer Science, Dec. 12, 1994.

* cited by examiner

*Primary Examiner*—Peter Szekely

(57) ABSTRACT

A flame retardant composition is provided containing (a) an aromatic polycarbonate resin, (b) a rubber modified graft copolymer, (c) a vinyl aromatic-unsaturated nitrile rigid copolymer, (d) a phosphate and (e) a tetrafluoroethylene polymer. The compositions contain elevated rubber loadings and/or utilize low molecular weight polycarbonate and/or low molecular weight vinyl aromatic-vinyl cyanide rigid copolymer. The composition exhibits enhanced retention of izod impact properties upon exposure to heat and humidity. The compositions are useful for making pellets which are stored and/or shipped in hot humid conditions, and which are then utilized for making molded business machine housings.

11 Claims, No Drawings

FLAME RETARDANT POLYCARBONATE/ GRAFT COPOLYMER BLENDS EXHIBITING HEAT AGING STABILITY

This is a continuation of application(s). Ser. No. 08/551, 595 field on Nov. 1, 1995 now abandoned.

BACKGROUND OF THE INVENTION

1. Field of the Invention

The present invention relates to flame retardant thermoplastic compositions, and more particularly relates to flame retardant thermoplastic compositions containing polycarbonate resins and a graft copolymer.

2. Description of the Related Art

Flame retarded compositions containing a acrylonitrile-butadiene-styrene (ABS) copolymers, a phosphate, and a polytetrafluoroethylene material are known, see Haaf et al., U.S. Pat. No. 4,107,232, issued Aug. 15, 1978. Flame resistant thermoplastic molding compositions containing (a) an aromatic polycarbonate (b) a styrene-acrylonitrile-butadiene graft copolymer, (c) a thermoplastic polymer such as styrene-acrylonitrile copolymer, (d) a halogen compound, (e) a flame retardant synergist and (f) a tetrafluoroethylene polymer (PTFE) are known, see Lindner et al., U.S. Pat. No. 4,810,739, issued Mar. 7, 1989. The utilization of phosphate flame retardants in ABS/aromatic polycarbonate blend compositions with PTFE is also known, but such compositions can exhibit less than desired levels of weatherability. Shipment and storage of thermoplastic (polycarbonate/graft copolymer (ABS) blends) articles such as business machining housings in extremely hot humid climates such as Southeast Asia can expose the articles to prolonged exposure to heat and humidity which can undesirably result in embrittlement and the loss of impact properties in the article.

Consequently, there is a need to develop polycarbonate/ABS graft copolymer compositions which exhibit enhanced retention of impact properties upon prolonged exposure to heat and humidity.

SUMMARY OF THE INVENTION

The present invention involves flame retardant thermoplastic compositions containing aromatic polycarbonate resin and a rubber modified vinyl aromatic-unsaturated nitrile-diene rubber graft copolymer. The compositions contain a high rubber graft copolymer or optionally contain in combination a low viscosity polycarbonate resin and a low molecular weight vinyl aromatic-unsaturated nitrile rigid copolymer. The compositions exhibit enhanced resistance to loss of IZOD impact properties upon exposure to heat and humidity aging.

DETAILED DESCRIPTION OF THE INVENTION

A thermoplastic composition is provided comprising (a) an aromatic polycarbonate resin, (b) a vinyl aromatic-unsaturated nitrile-diene rubber graft copolymer, (c) a vinyl aromatic-unsaturated nitrile rigid copolymer, (d) a phosphate and (e) a tetrafluoroethylene polymer. The graft copolymer preferably has a high rubber loading, and the polycarbonate resin is preferably a combination of a moderate molecular weight polycarbonate resin and a low molecular weight polycarbonate resin, and the vinyl aromatic-vinyl cyanide rigid copolymer is preferably a low molecular weight copolymer.

The aromatic polycarbonate resin preferably comprises a moderate molecular weight polycarbonate polymer and a low molecular weight polycarbonate. Preferably the aromatic polycarbonate resin is present at a level of from 60 to 90 percent by weight based on the total weight of the composition, more preferably from 75 to 85 percent by weight thereof, and most preferably from 78 to 82 percent by weight thereof. The use of low molecular weight aromatic polycarbonate resin allows for higher rubber levels for a given composition viscosity level. Preferably the moderate molecular weight polycarbonate polymer is present in the composition at a level of from 60 to 80 percent by weight based on the total weight of the composition, more preferably from 70 to 75 percent by weight thereof, and most preferably from 71 to 73 percent by weight thereof; and preferably the low molecular weight polycarbonate resin is present at a level of from 0 to 15 percent by weight based on the total weight of the composition, more preferably from 2 to 15 percent by weight thereof, and most preferably from 3 to 8 percent by weight thereof.

Polycarbonate resins suitable for use in this invention, are preferably aromatic polycarbonate resins. With respect to aromatic polycarbonate resins, these can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

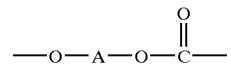

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis-(4-hydroxyphenyl)propane; 2,2-bis-(3,5dimethyl-4-hydroxyphenyl) propane; 4,4'-dihydroxydiphenyl ether, bis(2-hydroxyphenyl) methane, mixtures thereof and the like. The preferred aromatic carbonate polymer is a homopolymer derived from 2,2-bis-(4-hydroxyphenyl) propane (bisphenol-A).

The aromatic polycarbonate resin may be replaced in whole or in part with a poly(ester carbonate) resin. Poly (ester carbonates) for use in the invention are known and can be obtained commercially. Generally, they are copolyesters comprising recurring carbonate groups

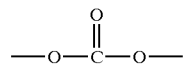

carboxylate groups

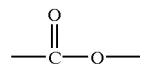

and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid, such as phthalic acid, isophtalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units can range from 1:0.30–0.80:0.70–0.20 and the molar range of terephthalate units to isophthalate units can range from 9:1 to 2:8 in this preferred family of resins.

The moderate molecular weight aromatic polycarbonate resin preferably has a number average molecular weight of between 25,000 and 80,000, for example, between 30,000 and 60,000, and for further example, between 35,000 and 40,000.

The low molecular weight aromatic polycarbonate resin preferably has a number average molecular weight of between 2,000 and 21,000, for example, between 5,000 and 10,000, and further for example, between 6,000 and 9,000.

The rubber graft copolymer comprises (i) the rubber substrate, (ii) a rigid polymeric superstrate portion grafted to the rubber substrate. The rubber substrate is preferably present in the graft copolyiner at a level of from 40 to 90 percent by weight based on the total weight of the graft copolymer composition, more preferably from 45 to 75 percent by weight thereof, and most preferably 50 to 60 percent by weight thereof; the rigid superstrate (and optional ungrafted (free) rigid in combination) is preferably present at a level of from 10 to 40 percent by weight based on the total weight of the graft copolymer, preferably from 25 to 55 percent by weight thereof, and most preferably from 40 to 50 percent by weight thereof.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof.

The diene rubbers may preferably be polybutadiene, polyisoprene and copolymers of butadiene with up to 35% by weight of comonomers such as styrene, acrylonitrile, methylmethacrylate or $C_1$–$C_8$-alkylacrylate which are produced by aqueous radical emulsion polymerisation and may optionally be crosslinked with di or tri-vinyl and/or allyl monomers or mixtures of such monomers or structures.

Specific conjugated diene monomers normally utilized in preparing the rubber substrate of the graft polymer are generically described by the following formula:

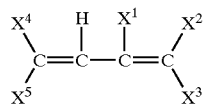

wherein each $X^1$, $X^2$, $X^3$, $X^4$ and $X^5$ is individually selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1, 3-pentadiene 1,3- and 2,4-hexadicnes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion exhibits a glass transition temperature (Tg) of less than about 0° C.

Mixtures of one or more rubbery polymers previously described as substrate for preparing the graft polymers, or mixtures of one or more graft polymers disclosed herein may also be employed. Furthermore, the rubber may comprise either a block or random copolymer.

Vinyl aromatic monomers which may be employed in making of the superstrate include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidenearomatic monomers utilized are generically described by the following formula:

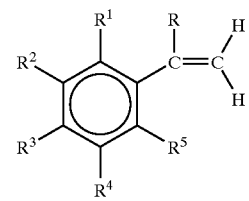

wherein each $R^1$, $R^2$, $R^3$, $R^4$ and $R^5$ is individually selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and. halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Monomers which may be used alone or in combination with the vinyl aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth) acrylates or mixtures thereof. The unsaturated nitrile (acrylonitrile or substituted acrylonitrile) or acrylic acid esters are described generically by the following formula:

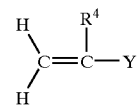

wherein $R^6$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred unsaturated nitrile monomer is acrylonitrile and the preferred acrylic acid esters are ethyl acrylate and methyl methacrylate. It is also preferred that the acrylic acid esters, when included, are employed in combination with styrene or acrylonitrile.

The number average molecular weight of the grafted rigid superstrate is designed to be in the range of 10,000 to 100,000. The ratio of the first monomer to the second monomer may range from 100/0 to 50/50 preferably 85/15 to 60/40. Additional monomer(s) may optional replace 0 to 50% of one or both of the first and second monomers. Preferred graft superstrates include copolymers of styrene and acrylonitrile, copolymers of α-methylstyrene and acrylonitrile, and methylmethacrylate polymers or copolymers with up to 50% by weight of $C_1$–$C_8$ alkylacrylates, acrylonitrile or styrene.

These graft copolymers may be polymerized either by emulsion or combined processes such as emulsion-suspension or other emulsion techniques well known in the art. Furthermore, these rubber modified monovinylidene graft copolymers may be produced either by continuous, semibatch or batch processes.

The preferred graft copolymers are selected from the group consisting of acrylonitrile-butadiene-styrene graft copolymers, methylmethacrylate-butadiene-styrene graft copolymers (for example, methylmethacrylate-alkyl acrylate grafted to butadiene or styrene-butadiene rubber), and methylmethacrylate-acrylonitrile-butadiene-styrene graft copolymers.

Specific examples of graft copolymers include but are not limited to the following: acrylonitrile-butadierie-styrene (ABS), methylmethacrylate-acrylonitrile-butadiene-styrene (MABS), methylinethacrylate-butadiene-styrene and methylmethacrylate-butadiene. Preferably the graft copolymer has a rubber level of 40 to 80 percent based on the total weight of the graft copolymer.

Suitable vinyl aromatic-unsaturated nitrile rigid polymers used in this invention are prepared from the vinylidene graft monovinylidene aromatic monomers (first monomer) as described previously and unsaturated nitrile monomers (second monomer) also described earlier. The compositional ratio of the first monomer to the second may range from 95/5 to 50/50 preferably 85/15 to 60/40. Additional monomer(s) may optionally replace 0 to 50% of one or both of the first and second monomers.

The number average molecular weight of the vinyl aromatic-vinyl cyanide rigid polymer is designed to be in the range of 10,000 to 100,000 and preferably from 10,000 to 100,000. Preferred rigid polymers include copolymers of styrene and acrylonitrile, and copolymers of methylmethacrylate with acrylonitrile and styrene.

These vinyl aromatic-unsaturated nitrile rigid polymers may be polymerized either by emulsion, emulsion-suspension, suspension or bulk techniques well known in the art. Furthermore, the rigid polymers may be produced either by continuous, semibatch or batch processes.

The phosphates (phosphoric esters) used for this purpose are represented by the following formula:

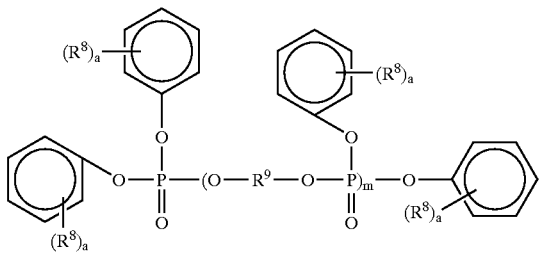

wherein $R^9$ represents a divalent organic group, $R^8$, which maybe the same or different, is selected from $C_1$ to $C_{20}$ aliphatic groups, $C_3$ to $C_1$ alicyclic groups and $C_6$ to $C_{18}$ aromatic groups, m represents a number between 1 to 30, and n represents an integer between 0 to 3.

Any of the phosphates represented by the formula can be used effectively by the compositions of this invention. $R^9$ in the formula is a divalent organic group selected from among $C_1$ to $C_{20}$, aliphatic groups, $C_3$ to $C_{13}$ alicyclic groups and $C_6$ to $C_{18}$ aromatic groups. Among the aromatic groups are particularly preferred from the viewpoint of the thermal resistance needed during extrusion or molding. Particularly effective aromatic groups include, for example, the following:

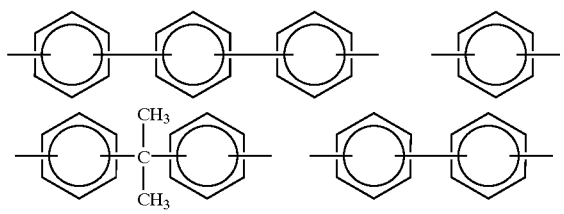

From the viewpoint of the cost of the starting material, $R^9$ is preferably

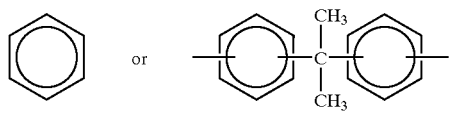

The groups represented by $R^8$ maybe the same or different from one another, are a $C_1$ to $C_{20}$ aliphatic group, a $C_3$ to $C_{13}$ alicyclic group, or a $C_6$ to $C_{18}$ aromatic group. Furthermore, even these phosphoric esters having no substituents, i.e. those phosphoric esters of the formula (1) wherein n is 0, serve to improve the impact resistance and tenacity, in addition to having sufficient heat resistance.

$R^8$ is preferably a methyl or isopropyl group. Particularly, a methyl group is most preferred, due to the balance between improved impact resistance, tenacity, thermal resistance, and blooming on the one hand, and the cost of the starting materials on the other hand. The integer n is preferably between 0 to 2, and particularly 0 or 1 is preferred from the viewpoint of blooming and thermal resistance, m, in formula (1) is at most 30 and is preferably at most 20.

The amount of the phosphate of the above formula used in the present invention is between about 0.5 to 20 wt. % based on the total weight of the composition, preferably 1 to 15 wt. % thereof, and more preferably from 3 to 15 percent by weight thereof.

Typical of the preferred phosphate compounds to be employed in this invention would be those having the general formula

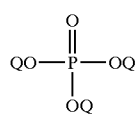

and nitrogen analogs thereof which each Q represents the same or different radicals including hydrocarbon radicals such as alkyl, cycloalkyl, aryl, alkyl substituted aryl and aryl substituted alkyl; halogen, hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-3,5,5'-trimethylhexyl phosphate), ethyldiphenyl phosphate, 2-ethylhexyl di(p-tolyl)phosphate, diphenyl hydrogen phosphate, bis(2-ethylhexyl) p-totylphosphate, tritolyl phosphate, bis(2-ethylhexyl)-phenyl phosphate, tri(nonylphenyl) phosphate, phenyl-methyl hydrogen phosphate, (di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate is combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides or phosphinic acid amides. These flame-retardant additives are commercially available.

Tetrafluoroethylene polymers which are suitable according to the invention have fluorine contents of 65–76% by weight, preferably 70–76% by weight. Examples are polytetrafluoroethylene, tetrafluoroethylene/hexafluoropropylene copolymers and tetrafluoroethylene copolymers containing small amounts of fluorine-free copolymerisable ethylenically unsaturated monomers. Such polymers are known from "Vinyl and Related Polymers", John Wiley & Sons, Inc., New York, 1952, pages 484–494; "Fluoropolymers", Wiley-Interscience, New York, 1972; "Encyclopedia of Polymer Science and Technology", Interscience Publishers, New York, Volume 13, 1970, pages 623–654; "Modem Plastics Encyclopedia", 1970–1971, Volume 47, No. 10 A, October 1970 McGrawHill, Inc., New York, pages 134, 138 and 774; "Modern Plastics Encyclopedia", 1975–1976, October 1975, Volume 52, No. 10 A, McGraw-Hill, Inc., New York, pages 27, 28 and 472 and U.S. Pat. Nos. 3,671,487, 3,723,373 and 3,838,092. The tetrafluoroethylene polymers of the present invention are in powder or latex form.

The phosphate is preferably present at a level of from 3 to 12 percent by weight based on the total weight of the composition, more preferably from 5 to 10 percent by weight thereof, and most preferably from 6 to 9 percent by weight thereof.

The tetraflouroethylene polymer is preferably present at a level of from 0.05 to 2 percent by weight based on the total weight of the composition, more preferably from 0.1 to 0.5 percent by weight thereof and most preferably from 0.2 to 0.4 percent by weight thereof.

If no low molecular weight polycarbonate or low molecular weight vinyl aromatic-unsaturated nitrile is present in the composition, then the composition preferably has a rubber loading of at least 6 percent, more preferably between 6 and 12 weight percent, and most preferable between 6 and 8 weight percent based on the total weight of the composition.

If the composition comprise a low molecular weight vinyl aromatic-vinyl cyanide rigid copolymer and/or a low molecular weight polycarbonate resin then the rubber level in the composition is preferably at least 4 percent by weight based on the total weight of the composition, more preferably from 4 to 12 percent by weight thereof, and most preferably from 4 to 6 percent by weight thereof.

The polycarbonate resin is preferably present at a level of from 60 to 90 percent by weight based on the total weight of the composition, more preferably from 75 to 85 percent by weight thereof, and most preferably about 80 percent by weight thereof. More preferably the polycarbonate resin in combination of a relatively high moderate molecular weight polycarbonate polymer and a low molecular weight polycarbonate polymer wherein the relatively high moderate molecular weight polycarbonate resin is present at a level of from 60 to 85 weight percent based on the total weight of the composition, more preferably from 70 to 80 percent by weight thereof, most preferably 71 to 73 percent by weight thereof; and wherein the low molecular weight resin is present at a level of from 5 to 20 weight percent based on the total weight of the composition, more preferably from 5 to 10 percent by weight thereof, and most preferably from 7 to 9 percent by weight thereof. The relatively high moderate molecular weight polycarbonate has a weight average molecular weight of between 30,000 to 80,000.

EXAMPLES

The current invention demonstrates that the retention of Izod impact strength after aging is significantly improved with increasing rubber content as compared to control sample. The physical properties are summarized in Table 1. The data show that with increasing HRG loading, the Izod impact strength after heat and humidity aging is excellent. All samples contain higher rubber than the control sample still retain about 80% of the original value and fail in ductile while the control sample fails in brittle with low impact value after one week. This is a very dramatic improvement over the current control sample. It seems that the higher rubbery phase toughens the embrittled matrix sufficiently and thus helps to retain the good impact strength.

Other additives can be antioxidant, heat stabilizer, lubricants of any kinds which will improve the processability.

TABLE 1

Formulations and Physical Properties of
FR PC/ABS Blends in Heat and Humidity Aging

|  | A | 1 | B | 2 |
|---|---|---|---|---|
| MPC1 |  |  | 80.55 | 72.58 |
| LPC2 |  |  |  | 7.97 |
| MPC3 | 80.55 | 80.55 |  |  |
| ABS1 | 8 | 0 | 6 | 8 |
| ABS2 | 0 | 8.6 |  |  |
| LSAN1 |  |  |  | 2.5 |
| MSAN2 | 2.5 | 1.9 | 4.5 |  |
| RDP | 8 | 8 | 8 | 8 |
| PTFE | 0.2 | 0.2 | 0.2 | 0.2 |
| Rubber Content (%) | 4.00 | 6.00 | 3 | 4 |
|  | A | 1 | B | 2 |
| Kayeness Viscosity (500 F) |  |  |  |  |
| 100/s | 3179 | 4225 | 5851 | 5758 |

TABLE 1-continued

Formulations and Physical Properties of
FR PC/ABS Blends in Heat and Humidity Aging

| | A | 1 | B | 2 |
|---|---|---|---|---|
| 250/s | 3144 | 3896 | 4760 | 4611 |
| 500/s | 2660 | 3379 | 3767 | 3670 |
| 1000/s | 2142 | 2667 | 2753 | 2755 |
| 1500/s | 1698 | 2132 | 2088 | 2091 |
| Izod (ft-lb/in) Aging Conditions: 63C/100%RH | | | | |
| 0 Days | 10.9 | 11.5 | 11.8 | 13.2 |
| 7 Days | 2.2 | 11.1 | 9 | 11.8 |
| 14 Days | 2.5 | 10.8 | 6.7 | 11.9 |
| 18 Days | 2.4 | 10.6 | 4.7 | 11 |
| 21 Days | 2.5 | 10.4 | 2.5 | 9.9 |
| 28 Days | 2.3 | 9.8 | 2.5 | 8.9 |

Examples A and B are comparative examples. Examples 1 and 2 are examples of the present invention.

The compositions of Examples A, B, 1 and 2 contained 0.10 percent by weight phosphite (Irgafos 168), 0.15 weight percent hindered phenolic (Irganox 1076), 0.50 weight percent lubricant (Glycolube P).

MPC1 is a moderate molecular weight bisphenol A polycarbonate having a weight average molecular weight of 30,000.

LPC2 is a low molecular weight bisphenol A polycarbonate having a weight average molecular weight of 20,500.

MPC3 is a moderate molecular weight bisphenol A polycarbonate having a weight average molecular weight of 25,600.

ABS1 is an acrylonitrile-butadiene-styrene graft copolymer having 50 percent by weight rubber.

ABS2 is an acrylonitrile-butadiene-styrene graft copolymer having 70 percent by weight rubber.

LSAN1 is a low molecular weight styrene-acrylonitrile copolymer having a weight average molecular weight of 60,000.

MSAN2 is a moderate molecular weight styrene-acrylonitrile copolymer having a weight average molecular weight of 100,000.

PTFE is a polytetrafluoroethylene polymer.

What is claimed is:

1. A flame retardant thermoplastic composition comprising
   an aromatic polycarbonate resin;
   a vinyl aromatic-unsaturated nitrile-diene rubber graft copolymer;
   a vinyl aromatic-unsaturated nitrile rigid resin in an amount of from 1 to about 2.5 weight percent based on the total weight of the composition;
   a phosphate; and
   a tetrafluoroethylene polymer, wherein the diene rubber of the graft copolymer is present in the amount of 6 to 12 percent by weight based on the total weight of the composition and the aromatic polycarbonate resin comprises a moderate molecular weight aromatic polycarbonate resin having a number average molecular weight between 25,000 and 80,000 and a low molecular weight aromatic polycarbonate resin having a number average molecular weight between 2,000 and 21,000.

2. The composition of claim 1, wherein the aromatic polycarbonate resin comprises a bisphenol A polycarbonate resin.

3. The composition of claim 1, wherein the a vinyl aromatic-unsaturated nitrile-diene rubber graft copolymer is an acrylonitrile-butadiene-styrene graft copolymer having a rubber level of between 40 to 80 percent by weight based on the total weight of the graft polymer.

4. The composition of claim 1, wherein the phosphate comprises an aromatic phosphate.

5. The composition of claim 1, wherein the vinyl aromatic-unsaturated nitrile rigid resin comprises a styrene-acrylonitrile copolymer having a number average molecular weight of between 10,000 and 100,000.

6. The composition of claim 1, wherein the moderate molecular weight aromatic polycarbonate resin is present at a level of from 60 to 80 percent by weight based on the total weigh of the composition.

7. The composition of claim 1, wherein the low molecular weight aromatic polycarbonate resin is present at a level of from 2 to 15 percent by weight based on the total weigh of the composition.

8. A flame retardant thermoplastic composition comprising
   an aromatic polycarbonate resin;
   a vinyl aromatic-unsaturated nitrile-diene rubber graft copolymer;
   a vinyl aromatic-unsaturated nitrile rigid resin;
   a phosphate; and
   a tetrafluoroethylene polymer, wherein the aromatic polycarbonate resin comprises a moderate molecular weight aromatic polycarbonate resin having a number average molecular weight between 25,000 and 80,000 and a low molecular weight aromatic polycarbonate resin having a number average molecular weight between 2,000 and 21,000, the vinyl aromatic-unsaturated nitrile rigid resin has a number average molecular weight from 10,000 to 100,000 and further wherein the diene rubber of the graft copolymer is present in an amount of 4 to 12 percent by weight based on the total weight of the composition.

9. The composition of claim 8, wherein the aromatic polycarbonate resin comprises a bisphenol A polycarbonate resin.

10. The composition of claim 8, wherein the a vinyl aromatic-unsaturated nitrile-diene rubber graft copolymer is an acrylonitrile-butadiene-styrene graft copolymer having a rubber level of between 40 to 80 percent by weight based on the total weight of the graft copolymer.

11. The composition of claim 8, wherein the phosphate comprises an aromatic phosphate.

* * * * *